United States Patent
Kadoi et al.

(10) Patent No.: US 12,494,512 B2
(45) Date of Patent: Dec. 9, 2025

(54) METHOD FOR PRODUCING NONAQUEOUS ELECTROLYTE SECONDARY BATTERY

(71) Applicant: Prime Planet Energy & Solutions, Inc., Tokyo (JP)

(72) Inventors: Masafumi Kadoi, Chita (JP); Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 798 days.

(21) Appl. No.: 17/525,978

(22) Filed: Nov. 15, 2021

(65) Prior Publication Data

US 2022/0158252 A1 May 19, 2022

(30) Foreign Application Priority Data

Nov. 16, 2020 (JP) ................. 2020-190307

(51) Int. Cl.
*H01M 10/0587* (2010.01)
*H01M 10/04* (2006.01)
(Continued)

(52) U.S. Cl.
CPC .... *H01M 10/0587* (2013.01); *H01M 10/0431* (2013.01); *H01M 10/0525* (2013.01);
(Continued)

(58) Field of Classification Search
CPC ......... H01M 10/0431; H01M 10/0525; H01M 10/0587; H01M 50/103; H01M 50/536; H01M 50/618
(Continued)

(56) References Cited

U.S. PATENT DOCUMENTS

2011/0129712 A1* 6/2011 Fuhr ................. H01M 10/0587
  29/730
2013/0122359 A1* 5/2013 Sato ..................... H01M 4/661
  429/188
(Continued)

FOREIGN PATENT DOCUMENTS

CN 103597638 A 2/2014
JP H5114397 A 5/1993
(Continued)

OTHER PUBLICATIONS

English language machine translation of "Method and Device for Manufacturing Power Storage Device" in JP2013-030353 (A) by Sugano Yukinobu (Year: 2013).*

*Primary Examiner* — Niki Bakhtiari
*Assistant Examiner* — Omar M Kekia
(74) *Attorney, Agent, or Firm* — HAUPTMAN HAM, LLP

(57) ABSTRACT

The present disclosure provides a method for producing a nonaqueous electrolyte secondary battery that allows a nonaqueous electrolyte solution to permeate, reliably and in a short time, into a wound electrode body. The method for producing a nonaqueous electrolyte secondary battery includes at least a winding step of forming a wound electrode body, a terminal connection step of connecting an electrode terminal to the wound electrode body, and a sealing step of accommodating the wound electrode body inside a battery case, and thereafter sealing the battery case. The production method disclosed herein includes, between the winding step and the terminal connection step, a permeation step of immersing a wound electrode body in a nonaqueous electrolyte solution, and repeatedly pressing and releasing the wound electrode body.

18 Claims, 10 Drawing Sheets

(51) Int. Cl.
  *H01M 10/0525* (2010.01)
  *H01M 50/103* (2021.01)
  *H01M 50/536* (2021.01)
  *H01M 50/618* (2021.01)

(52) U.S. Cl.
  CPC ........ *H01M 50/103* (2021.01); *H01M 50/536* (2021.01); *H01M 50/618* (2021.01)

(58) Field of Classification Search
  USPC ....................................................... 29/623.2
  See application file for complete search history.

(56) References Cited

U.S. PATENT DOCUMENTS

| | | | |
|---|---|---|---|
| 2014/0117940 A1 | 5/2014 | Takahata | |
| 2014/0234676 A1* | 8/2014 | Tyler | H01M 50/528 429/82 |
| 2015/0135522 A1 | 5/2015 | Seto et al. | |
| 2016/0254523 A1 | 9/2016 | Tsukui et al. | |
| 2020/0287234 A1* | 9/2020 | Umetsu | H01M 4/525 |
| 2022/0190380 A1* | 6/2022 | Hirakawa | H01G 11/50 |

FOREIGN PATENT DOCUMENTS

| | | | | |
|---|---|---|---|---|
| JP | H11339855 A | | 12/1999 | |
| JP | 2000164259 A | | 6/2000 | |
| JP | 2003036885 A | | 2/2003 | |
| JP | 2009170137 A | | 7/2009 | |
| JP | 2012142099 A | | 7/2012 | |
| JP | 2013030353 | * | 2/2013 | ........ H01M 10/0587 |
| JP | 2013030353 A | | 2/2013 | |
| JP | 2013152834 A | | 8/2013 | |
| JP | 2013206755 A | | 10/2013 | |
| JP | 2014130729 A | | 7/2014 | |
| JP | 201579578 A | | 4/2015 | |
| JP | 2020149802 A | | 9/2020 | |

* cited by examiner

METHOD FOR PRODUCING NONAQUEOUS ELECTROLYTE SECONDARY BATTERY

CROSS REFERENCE TO RELATED APPLICATIONS

The present application claims priority based on Japanese Patent Application No. 2020-190307 filed on Nov. 16, 2020, the entire contents whereof are incorporated in the present specification by reference

BACKGROUND

1. Technical Field

The present disclosure relates to a method for producing a nonaqueous electrolyte secondary battery.

2. Description of the Related Art

Secondary batteries such as lithium ion secondary batteries are widely used nowadays in various fields. For instance secondary batteries are used as power sources for vehicle drive, for instance in hybrid electric vehicles, plug-in hybrid electric vehicles and electric vehicles. One aspect of this type of secondary batteries is a nonaqueous electrolyte secondary battery that utilizes a nonaqueous electrolyte as the electrolyte. Such nonaqueous electrolyte secondary batteries are ordinarily produced by injecting a nonaqueous electrolyte solution into a battery case having an electrode body accommodated therein.

In order for the nonaqueous electrolyte secondary battery to deliver an appropriate battery performance, the nonaqueous electrolyte solution has to sufficiently permeate into the electrode body (in between the positive electrode and the negative electrode). Battery resistance may rise significantly if permeation of the nonaqueous electrolyte solution is insufficient. Permeation of nonaqueous electrolyte solution may however be difficult depending on the structure of the electrode body. Examples of electrode body structures include for instance a wound electrode body resulting from winding of sheet members such as a separator, a positive electrode and a negative electrode. In such a wound electrode body a flow channel through which the nonaqueous electrolyte solution flows is limited to both side faces of the wound electrode body. Moreover, the distance between the positive electrode and the negative electrode in the wound electrode body is very small, and accordingly the nonaqueous electrolyte solution permeates so as to gradually seep into the wound electrode body by capillarity. Therefore, just accommodating together a wound electrode body and a nonaqueous electrolyte solution in a battery case may entail a need for a very long permeation time (about several months).

Therefore, various techniques have been proposed for promoting permeation of a nonaqueous electrolyte solution into a wound electrode body. For instance JP H05-114397 and JP H11-339855 disclose a technique that involves impregnating sheet members (separators and so forth) with a nonaqueous electrolyte solution, prior to producing a wound electrode body. Permeation of the nonaqueous electrolyte solution into the wound electrode body can be promoted by wetting thus the sheet members beforehand. Further, JP 2013-206755 discloses a technique wherein a wound electrode body is produced through winding of sheet members on the inward side of a C-shaped sleeve, the wound electrode body being then accommodated within a case, together with the sleeve, after which the sleeve is removed. In consequence, the winding tension of the electrode body is eased within the battery case and the distance between the positive electrode and the negative electrode increases, as a result of which the nonaqueous electrolyte solution permeates more readily. Further, J P 2015-79578 discloses a technique in which the interior of a battery case is depressurized prior to injection of a nonaqueous electrolyte solution, to thereby generate a differential pressure between the interior and the exterior of a wound electrode body. As a result, the nonaqueous electrolyte solution permeates into the wound electrode body so as to cancel the above differential pressure; permeation of the nonaqueous electrolyte solution by capillarity is promoted thereby.

SUMMARY

The performance required from nonaqueous electrolyte secondary batteries has become ever more demanding in recent years, and accordingly wound electrode bodies have become larger, to meet such a demand Specifically, design trends in nonaqueous electrolyte secondary batteries in recent years include a larger outer dimension (width dimension and height dimension) of the wound electrode body, and a greater number of winding turns of sheet members. It has become difficult to utilize techniques such as those above on account of the increased size of the wound electrode body.

In a case for instance where the number of winding turns of sheet members is increased, a stronger tension acts accordingly on each sheet member at the time of winding. As disclosed in JP H05-114397 and JP H11-339855, when sheet members wet with a nonaqueous electrolyte solution are used in this case, sheet member damage and winding defects occur frequently since the sheet members virtually do not slip on each other when wound while superimposed on each other. In addition, the nonaqueous electrolyte solution with which the sheet members are impregnated may scatter during winding, thereby degrading the manufacturing environment. Moreover, the technique disclosed in JP 2013-206755, in which the distance between the positive electrode and the negative electrode is increased through easing of tension at the time of winding, cannot obviously be resorted to in a large-size wound electrode body in which the number of winding turns has been increased for the purpose of improving battery performance.

Meanwhile, the technique disclosed in JP 2015-79578, relying on creating a differential pressure between the interior and the exterior of an electrode body through depressurization, can elicit a certain effect even when a large-size wound electrode body is used. The permeation time that can be shortened by resorting to such a technique is however limited, and it can hardly be asserted that this technique allows sufficiently suppressing drops in manufacturing efficiency derived from increasing the size of the electrode body. Studies by the inventors of the present disclosure have revealed that when adopting the technique disclosed in JP 2015-79578, the permeation time of a wound electrode body of conventional size can be shortened to about several hours. However, it has been found that the permeation time of a large-size wound electrode body is several tens of hours, even when using the technique disclosed in JP 2015-79578.

It is thus an object of the present disclosure, arrived at in order to solve the above problem, to provide a method for producing a nonaqueous electrolyte secondary battery that allows a nonaqueous electrolyte solution to permeate into a wound electrode body reliably and in a short time.

In order to attain the above goal, the present disclosure provides a method for producing a nonaqueous electrolyte secondary battery (hereafter also simply referred to as "production method") having the features below.

The production method disclosed herein is a method for producing a nonaqueous electrolyte secondary battery in which a wound electrode body and a nonaqueous electrolyte solution are accommodated inside a battery case. Such a production method includes at least a winding step of forming a wound electrode body by winding a positive electrode and a negative electrode across a separator, a terminal connection step of connecting an electrode terminal to the wound electrode body, and a sealing step of accommodating the wound electrode body inside a battery case, and thereafter sealing the battery case. The production method disclosed herein has a permeation step, between the winding step and the terminal connection step, of immersing the wound electrode body in the nonaqueous electrolyte solution and repeatedly pressing and releasing the wound electrode body, to thereby cause the nonaqueous electrolyte solution to permeate into the wound electrode body.

In the production method disclosed herein a permeation step is performed in which pressing and releasing of the wound electrode body is repeated in a state where the wound electrode body is immersed in the nonaqueous electrolyte solution. In consequence, the wound electrode body undergoes elastic deformation and a space between the positive electrode and the negative electrode opens and closes, as a result of which the nonaqueous electrolyte solution is pumped towards the interior of the wound electrode body and air present between the electrodes is pushed out. Through permeation of the nonaqueous electrolyte solution by exploiting such a pumping effect, the permeation time can be significantly shortened, as compared with conventional art relying on capillarity. In the production method disclosed herein the permeation step is performed after the winding step. This allows preventing for instance damage to the sheet members caused by performing the winding step is carried out with wet sheet members. When an electrode terminal is connected to the wound electrode body, part of the wound electrode body (electrolyte solution flow channel) on both side faces thereof is plugged, and permeability to the electrolyte solution tends to drop in consequence. In the production method disclosed herein, by contrast, the permeation step is carried out prior to the terminal connection step. Further reductions in permeation time can be achieved as a result. By eliciting the above effects, the production method disclosed herein allows shortening to about several tens of minutes the permeation time, which was conventionally of several hours to several tens of hours.

In accordance with another preferable aspect of the production method disclosed herein the pressure at the time of pressing of the wound electrode body in the permeation step is set to 0.7 kN/m² to 1 kN/m². As a result a pumping effect is properly elicited and the nonaqueous electrolyte solution can be suitably pumped into the wound electrode body.

In accordance with another preferable aspect of the production method disclosed herein the number of times that the wound electrode body is pressed in the permeation step is set to 3 times to 4 times. As a result, a pumping effect is properly elicited and the nonaqueous electrolyte solution can be suitably permeated into the wound electrode body.

In accordance with another preferable aspect of the production method disclosed herein there are provided a temporary pressing step of shaping the wound electrode body, through pressing, to a flat shape, and a main pressing step of further pressing a flat surface of the flat-shaped wound electrode body, to plastically deform the wound electrode body up to a thickness enabling accommodation in the battery case. In this mode, the temporary pressing step is provided between the winding step and the permeation step, and the main pressing step is provided between the permeation step and the terminal connection step. Leakage of a large amount of the nonaqueous electrolyte solution from the wound electrode body after the permeation step can be suppressed by shaping thus the flat-shaped wound electrode body prior to the permeation step. On the other hand, when the wound electrode body is plastically deformed completely, the distance between the positive electrode and the negative electrode becomes fixed as a small distance, and accordingly it is difficult to bring out a pumping effect in the permeation step. Preferably, therefore, the main pressing step is carried out after the permeation step, as in the present case.

In a case where the temporary pressing step is carried out, the pressure at the time of pressing of the wound electrode body in the temporary pressing step is preferably set to 0.1 kN/m² to 0.5 kN/m². As a result the wound electrode body can be properly elastically deformed in the permeation step.

In accordance with another preferable aspect of the production method disclosed herein the electrode terminal is connected to the wound electrode body by resistance welding or laser welding, in the terminal connection step. This allows the wound electrode body and the electrode terminal to be firmly connected to each other even though nonaqueous electrolyte solution is adhered to the wound electrode body.

In accordance with another preferable aspect of the production method disclosed herein a film accommodation step of accommodating the wound electrode body in a box-shaped insulating film that insulates the battery case and the wound electrode body is provided between the terminal connection step and the sealing step. As a result it becomes possible to suppress deterioration of the manufacturing environment derived from scattering, over a wide area, of nonaqueous electrolyte solution having leaked from the wound electrode body after the permeation step.

In a case where the film accommodation step is carried out, the wound electrode body is inserted in the insulating film while a plate-shaped guide plate is brought into contact with the surface of the wound electrode body, in the film accommodation step. This mode allows accommodating the wound electrode body inside the insulating film while preventing close contact between the wound electrode body and the insulating film, and as a result allows cutting drops in manufacturing efficiency.

In a case where the film accommodation step is carried out, preferably the wound electrode body accommodated in the insulating film is disposed at the top in the direction of gravity, and the battery case is disposed at the bottom in the direction of gravity, in the sealing step. Thereby, the nonaqueous electrolyte solution having leaked from the wound electrode body can be held inside the insulating film, and thus scattering of the nonaqueous electrolyte solution over a wide area can be prevented as a result.

In a case where the battery case is disposed at the bottom in the sealing step, as described above, preferably a top face opening of the battery case is covered with a movable cover until the wound electrode body starts being accommodated inside the battery case. Foreign matter can be prevented as a result from contaminating the interior of the battery case.

If the battery case is disposed at the bottom in the sealing step, as described above, then in the sealing step preferably the wound electrode body is accommodated inside the battery case in a state where an upper end face of the battery case is covered with an end cover. This allows preventing the nonaqueous electrolyte solution having leaked from the insulating film from adhering to the top face end of the battery case, and allows preventing hindrance to sealing of the battery case.

The production method disclosed herein can be used particularly preferably to produce a nonaqueous electrolyte secondary battery that utilizes a large-size wound electrode body. As described above, although a large wound electrode body contributes to increasing capacity and increasing energy density, it is however difficult to cause a sufficient amount of nonaqueous electrolyte solution to permeate in a short time. In the production method disclosed herein, by contrast, the nonaqueous electrolyte solution can be caused to permeate reliably and in a short time also in a large-size wound electrode body.

For instance, the production method disclosed herein is suitably used for producing a nonaqueous electrolyte secondary battery provided with a wound electrode body having a width dimension of 200 mm or larger. In such a wound electrode body of large width dimension it is difficult to cause a nonaqueous electrolyte solution to sufficiently permeate up to a central portion in the width direction only by capillarity, as in conventional art. In the production method disclosed herein, by contrast, the space between the electrodes of the wound electrode body is repeatedly closed and opened in the permeation step, and the nonaqueous electrolyte solution is pumped into the wound electrode body on account of the resulting pumping effect. It becomes therefore possible to sufficiently cause the nonaqueous electrolyte solution to permeate up to a central portion in the width direction also in a large-size wound electrode body having a width dimension of 200 mm or larger.

The production method disclosed herein is suitably used for producing a nonaqueous electrolyte secondary battery provided with a wound electrode body having a height dimension of 100 mm or larger. Such wound electrode bodies of large height dimension are problematic in that the nonaqueous electrolyte solution is not readily supplied to an upper region in the direction of gravity. In the production method disclosed herein, by contrast, the permeation step is executed in a state where the wound electrode body is immersed in the nonaqueous electrolyte solution, and accordingly the nonaqueous electrolyte solution can be caused to sufficiently permeate up to an upper end portion in the height direction, also in a large-size wound electrode body having a height dimension of 100 mm or larger.

The production method disclosed herein is suitably used for producing a nonaqueous electrolyte secondary battery provided with a wound electrode body having 35 or more winding turns. Winding tension is strong in such electrode bodies having a high number of winding turns, and accordingly the distance between the positive electrode and the negative electrode is smaller, whereby the nonaqueous electrolyte solution tends to permeate less readily. In the production method disclosed herein, by contrast, the space between the electrodes of the wound electrode body is repeatedly closed and opened, and the nonaqueous electrolyte solution is pumped into the wound electrode body; as a result, the nonaqueous electrolyte solution can be caused to permeate sufficiently, also in a large-size wound electrode body having 35 or more winding turns.

DETAILED DESCRIPTION

Figure 1:
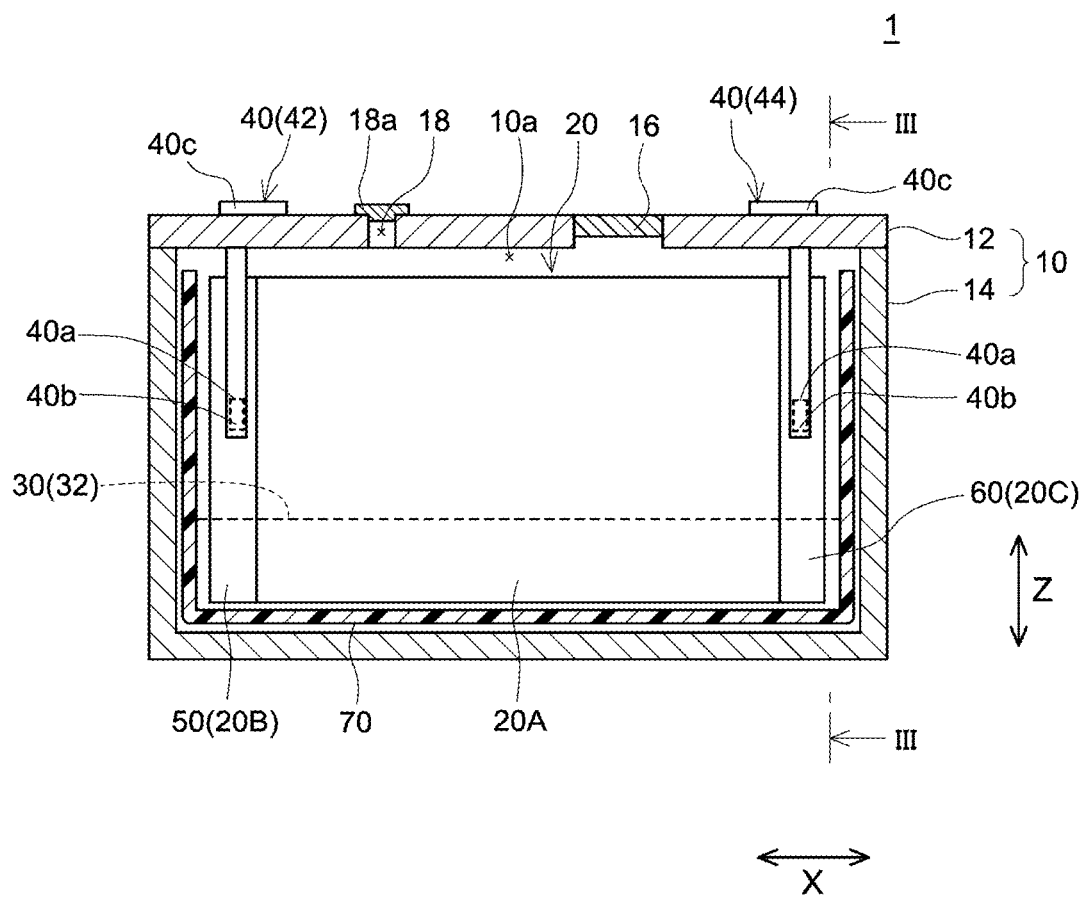
FIG. 1 is a front-view diagram illustrating schematically the internal structure of a nonaqueous electrolyte secondary battery.

Embodiments of the technology disclosed herein will be explained in detail below with reference to accompanying drawings. Any features other than the matter specifically set forth in the present specification and that may be necessary for carrying out the technology disclosed herein can be regarded as design matter for a person skilled in the art based on conventional art in the relevant technical field. The technology disclosed herein can be realized on the basis of the disclosure of the present specification and common technical knowledge in the relevant technical field. In the drawings that accompany the explanation below, members and portions that elicit identical effects are explained while denoted by identical reference numerals. The dimensional relationships (length, width, thickness and so forth) in the figures do not reflect actual dimensional relationships.

The term "secondary battery" in the present specification signifies a power storage device in general that allows for repeated charge and discharge as a result of movement of charge carriers between a positive electrode and a negative electrode via an electrolyte. The term "nonaqueous electrolyte secondary battery" denotes a secondary battery that utilizes a nonaqueous electrolyte solution as the electrolyte. The term "nonaqueous electrolyte secondary battery" in the present specification encompasses so-called storage batteries such as lithium ion secondary batteries, nickel-metal hydride batteries and nickel-cadmium batteries, as well as capacitors such as electrical double layer capacitors. That is, the method for producing a nonaqueous electrolyte secondary battery disclosed herein is not a method for producing a specific type of battery, but a method that can be widely resorted to in the production of nonaqueous electrolyte secondary batteries in general.

1. Structure of a Nonaqueous Electrolyte Secondary Battery

Figure 2:
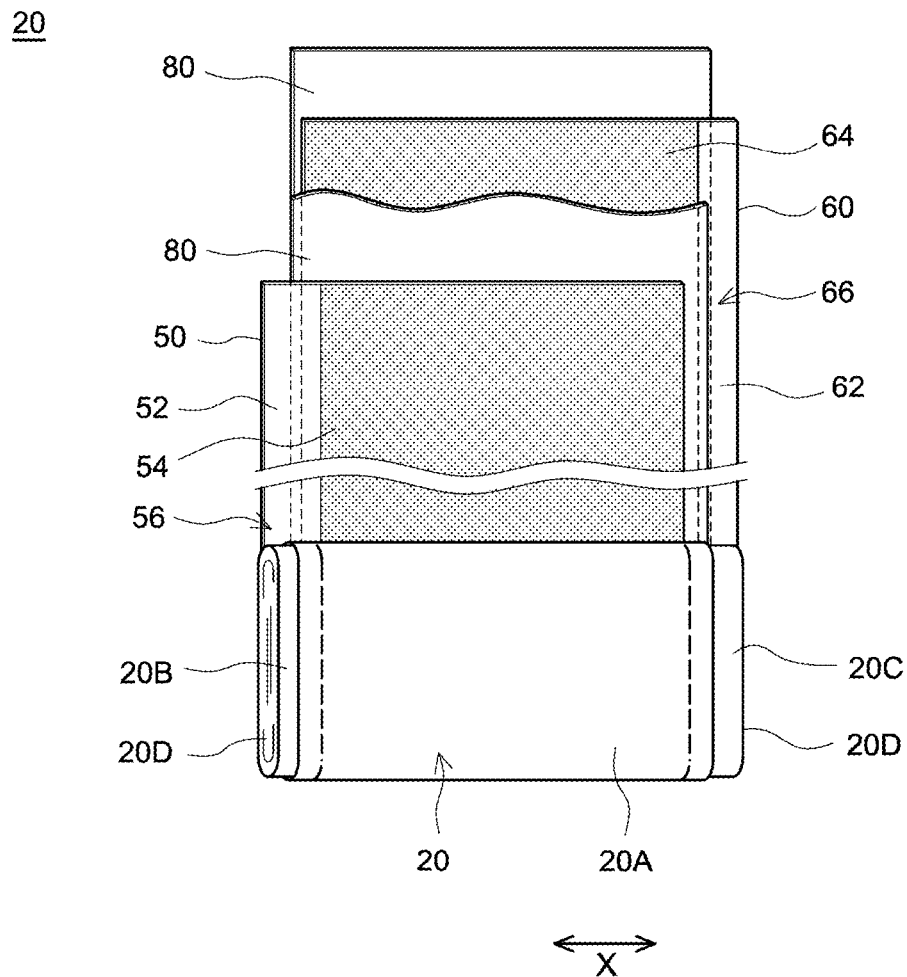
FIG. 2 is a perspective-view diagram for explaining the structure of a wound electrode body.
Figure 3:
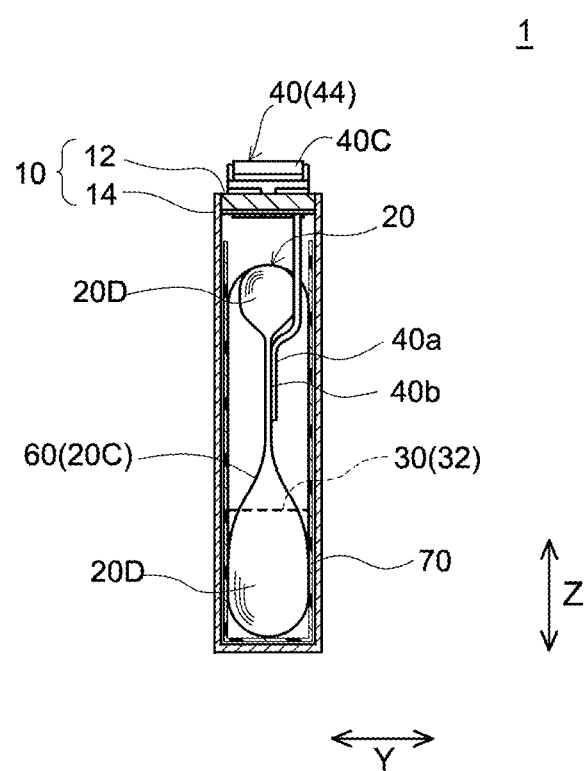
FIG. 3 is a diagram of the view from arrow III-III in FIG. 1.

An explanation follows next on an example of the structure of a nonaqueous electrolyte secondary battery which is the target of the production method disclosed herein. FIG. 1 is a front-view diagram illustrating schematically the internal structure of a nonaqueous electrolyte secondary battery. FIG. 2 is a perspective-view diagram for explaining the structure of a wound electrode body. FIG. 3 is a diagram of the view from arrow III-III in FIG. 1. The reference symbol X in the figures of the present specification denotes a "width direction", the reference symbol Y denotes a "depth direction", and the reference symbol Z denotes a "height direction". It should be noted that these directions are defined however for convenience of explanation, and are not intended to limit the manner in which the nonaqueous electrolyte secondary battery is arranged, during use or manufacture.

As illustrated in FIG. 1, a nonaqueous electrolyte secondary battery 1 is provided with a battery case 10, a wound electrode body 20, and a nonaqueous electrolyte solution 30. Specifically, the nonaqueous electrolyte secondary battery 1 can be constructed by accommodating the wound electrode body 20 and the nonaqueous electrolyte solution 30 in the interior of the battery case 10, and by sealing the battery case 10. The values structures of the battery will be explained below.

(1) Battery Case

The battery case 10 is a flat square case. An internal space 10a having a substantially rectangular shape is formed in the battery case 10. A wound electrode body 20 and a nonaqueous electrolyte solution 30 are accommodated in this internal space 10a. The battery case 10 includes a box-shaped case body 14 on the top face whereof there is formed an opening communicating with the internal space 10a, and a plate-like lid body 12 that closes the opening of the case body 14. Further, the lid body 12 illustrated in FIG. 1 is provided with a safety valve 16 and a filling port 18. The safety valve 16 is configured to be released when the internal pressure of battery case 10 rises to or above a predetermined level. Expansion of the battery case 10 due to an increase in internal pressure can be prevented thereby. The filling port 18 is an opening formed in the battery case 10 (lid body 12) in order to provide surplus electrolyte solution 32. In the nonaqueous electrolyte secondary battery 1 after production the filling port 18 is sealed by a sealing plug 18a. The battery case 10 is preferably made of a lightweight material having good thermal conductivity (for instance aluminum or an aluminum alloy).

A pair of electrode terminals 40 is attached to the battery case 10 (lid body 12) of the nonaqueous electrolyte secondary battery 1. Each electrode terminal 40 is an elongated conductive member extending in the height direction Z. A lower end 40a of such an electrode terminal 40 is connected to the wound electrode body 20 in the interior of the battery case 10. Meanwhile, an upper end 40c of the electrode terminal 40 is exposed outside the battery case 10. In the present specification the electrode terminal 40 connected to a positive electrode 50 of the wound electrode body 20 will be referred to as "positive electrode terminal 42" and the electrode terminal 40 connected to a negative electrode 60 will be referred to as "negative electrode terminal 44". The material of the electrode terminals 40 is not particularly limited, and metallic materials (aluminum, copper or the like) that can be used in the electrode terminals of general nonaqueous electrolyte secondary batteries may be used herein without particular limitations.

(2) Wound Electrode Body

As illustrated in FIG. 2, the wound electrode body 20 is formed through winding of a positive electrode 50 and the negative electrode 60 across separators 80. The members (positive electrode 50, negative electrode 60 and separators 80) that make up the wound electrode body 20 are all elongated sheet-shaped members. In the present specification, therefore, these constituent members of the wound electrode body 20 may be referred to collectively as "sheet member".

The positive electrode 50 includes a positive electrode collector 52 which is an elongated foil-shaped conductive member, and a positive electrode active material layer 54 that is applied on a surface (for instance both faces) of the positive electrode collector 52. On one side edge portion (left side in FIG. 2) of the positive electrode 50 in the width direction X there is formed a region (positive electrode exposed portion 56) at which the positive electrode active material layer 54 is not applied and at which the positive electrode collector 52 is exposed. The negative electrode 60 as well has substantially the same configuration as that of the positive electrode 50. Specifically, the negative electrode 60 includes a negative electrode collector 62 which is an elongated foil-shaped conductive member, and a negative electrode active material layer 64 applied on a surface (for instance both faces) of the negative electrode collector 62. On the other edge portion (right side in FIG. 2) of the negative electrode 60 in the width direction X there is formed a region (negative electrode exposed portion 66) at which the negative electrode active material layer 64 is not applied and at which the negative electrode collector 62 is exposed. Each separator 80 is an elongated insulating sheet having formed therein multiple small voids through which charge carriers can pass. The wound electrode body 20 illustrated in FIG. 2 has two separators 80. One separator 80 is arranged between the positive electrode 50 and the negative electrode 60. The other separator 80 is disposed outward of the negative electrode 60. By winding the sheet members in this state a wound electrode body 20 can be formed that has a respective separators 80 interposed between each positive electrode 50 and each negative electrode 60. Materials that can be used in secondary batteries in general may be utilized herein without particular limitations as the materials of the sheet members; the materials of the sheet members do not restrict the technology disclosed herein, and accordingly a detailed explanation of the materials will be omitted.

At the central portion of the wound electrode body 20 in the width direction X a core portion 20A is formed in which the positive electrode active material layer 54 and the negative electrode active material layer 64 face each other, the core portion 20A being the main site at which charge and discharge reactions occur. In addition, a positive electrode connection portion 20B at which only the positive electrode exposed portion 56 is wound is formed on one side edge portion of the wound electrode body 20 in the width direction X. Meanwhile, a negative electrode connection portion 20C in which only the negative electrode exposed portion 66 is wound is formed on the other side edge portion in the width direction X. Both side faces of the wound electrode body 20 in the width direction X are open to the exterior. That is, an electrolyte solution flow channel 20D for allowing the nonaqueous electrolyte solution 30 to flow is formed, in the wound electrode body 20, at both side faces in the width direction X.

As illustrated in FIG. 3, the lower end 40a of the negative electrode terminal 44 is connected to the negative electrode connection portion 20C. Specifically, the vicinity of the central portion of the negative electrode connection portion 20C in the height direction Z is compressed in the depth direction Y, and multiple negative electrode exposed portions 66 (negative electrode collectors 62) are gathered (see FIG. 2). The vicinity of the central portion of the negative electrode connection portion 20C and the lower end 40a of the negative electrode terminal 44 are joined. As a result there is formed a connection portion 40b that connects the wound electrode body 20 and the electrode terminal 40. The vicinity of the central portion of the electrolyte solution flow channel 20D in the height direction Z becomes plugged by virtue of the fact that the electrode terminal 40 is connected in this manner. That is, in the wound electrode body 20 after connection of the electrode terminal 40 only the upper end portion and the lower end portion of the electrolyte solution flow channel 20D remain in an open state, and hence the flowability of the nonaqueous electrolyte solution 30 decreases accordingly. As illustrated in FIG. 1, the positive electrode terminal 42 is connected to the positive electrode connection portion 20B. The connection portion between the positive electrode connection portion 20B and the positive electrode terminal 42 has the same configuration as that of the connection portion between the negative electrode connection portion 20C and the negative electrode terminal 44 described above, and that configuration is therefore neither explained in detail nor illustrated in the figures.

(3) Nonaqueous Electrolyte Solution

The nonaqueous electrolyte solution 30 is accommodated in the interior of battery case 10 together with the wound electrode body 20. Most of the nonaqueous electrolyte solution 30 permeates into the wound electrode body 20 (between the positive electrode 50 and the negative electrode 60). However, part of the nonaqueous electrolyte solution 30 may be present outside the wound electrode body 20 (between the wound electrode body 20 and the battery case 10) as surplus electrolyte solution 32. As a result, surplus electrolyte solution 32 can be supplied to the interior of the wound electrode body 20 when the nonaqueous electrolyte solution 30 within the wound electrode body 20 becomes insufficient. The nonaqueous electrolyte solution 30 is prepared by dissolving a supporting salt in a nonaqueous solvent. Components that can be used in general secondary batteries may be utilized, without particular limitations, as the components of the nonaqueous electrolyte solution 30; such components do not restrict the technology disclosed herein, and accordingly a detailed explanation thereof will be omitted.

(4) Other Features

In the nonaqueous electrolyte secondary battery 1 illustrated in FIG. 1, the wound electrode body 20 is accommodated in the interior of an insulating film 70 that is formed to a box shape. By interposing thus the insulating film 70 between the battery case 10 and the wound electrode body 20 it becomes possible to prevent conduction of the battery case 10 and the wound electrode body 20. As described in detail below, accommodating thus the wound electrode body 20 in the interior of such a box-shaped insulating film 70 allows moreover preventing deterioration of the manufacturing environment derived from scattering, over a wide area, of nonaqueous electrolyte solution 30 having leaked from the wound electrode body 20, during production of the nonaqueous electrolyte secondary battery 1.

2. Method for Producing a Nonaqueous Electrolyte Secondary Battery

Figure 4:
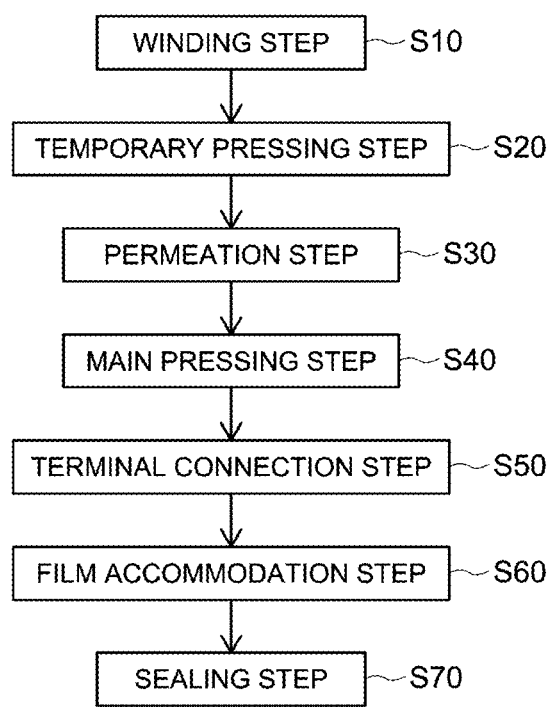
FIG. 4 is a flowchart for explaining a production method according to an embodiment.

An embodiment of a method for producing the nonaqueous electrolyte secondary battery disclosed herein will be explained next. FIG. 4 is a flowchart for explaining a production method according to the present embodiment. The method for producing a nonaqueous electrolyte secondary battery disclosed herein has at least a winding step S10, a terminal connection step S50, and a sealing step S70. A characterizing feature of the method is that a permeation step S30 is provided between the winding step S10 and the terminal connection step S50. As described in detail below, in the production method according to the present embodiment a sufficient amount of nonaqueous electrolyte solution can permeate reliably and in a short time into the wound electrode body in the permeation step S30, thanks to which it becomes possible to significantly shorten the time required to produce the nonaqueous electrolyte secondary battery.

The production method disclosed herein may include various production processes in addition to the above-described winding step S10, permeation step S30, terminal connection step S50 and sealing step S70. For instance as illustrated in FIG. 4, the production method according to the present embodiment has a temporary pressing step S20, a main pressing step S40 and a film accommodation step S60, besides the various steps mentioned above. The various steps that make up the production method according to the present embodiment will be explained next.

(1) Winding Step S10

Figure 5:
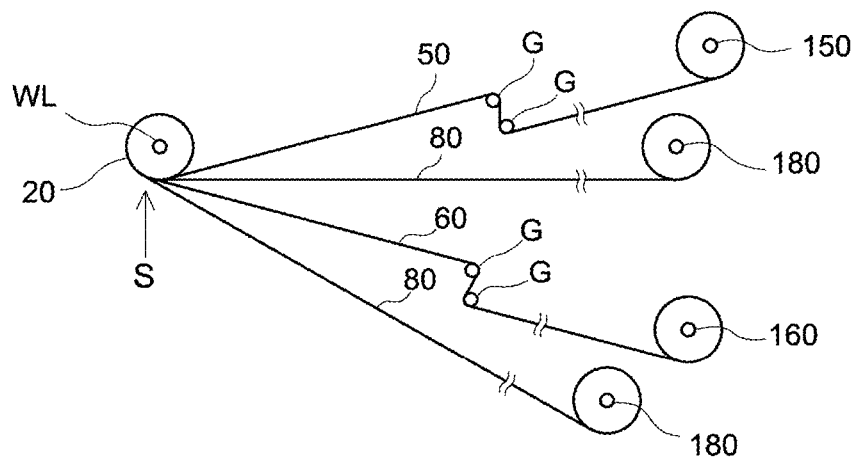
FIG. 5 is a side-view diagram illustrating schematically a winding step of a production method according to an embodiment.

FIG. 5 is a side-view diagram illustrating schematically a winding step of the production method according to the present embodiment. As illustrated in FIG. 5, in the present step the wound electrode body 20 is formed by winding the positive electrode 50 and the negative electrode 60 across a respective separator 80. Specifically, firstly there are prepared a positive electrode supply part 150 around which the sheet-shaped positive electrode 50 is wound, a negative electrode supply part 160 around which the sheet-shaped negative electrode 60 is wound, and separator supply parts 180 around which the sheet-shaped separators 80 is wound. The sheet members from the positive electrode supply part 150, the negative electrode supply part 160 and the separator supply parts 180 are paid out, and the tips of the respective sheet members are attached to a cylindrical winding shaft WL. Through rotation of the winding shaft WL, a separator 80, the negative electrode 60, a separator 80, and the positive electrode 50 are then wound around the winding shaft WL while being overlaid on each other in the above order. After winding of the sheet members over a predetermined number turns, a wound electrode body 20a of cylindrical shape can then be produced by cutting the sheet members and removing the cut sheet members off the winding shaft WL.

In the winding step S10 illustrated in FIG. 5, guide rolls G are arranged in the transport paths of the positive electrode 50 and the negative electrode 60 so that the sheet members are overlaid on each other at substantially the same timing. The sheet members are wound around the winding shaft WL, while sliding on each other, at a stacking point S at which the sheet members are overlaid on each other. The winding tension that acts on the sheet members can be made uniform as a result. When the sheet members are wet with a nonaqueous electrolyte solution or the like, however, the sheet members may fail to slide on each other at the stacking point S. In this case a large winding tension may act on a specific sheet member, which may result in winding defects or sheet member breakage. In the production method according to the present embodiment, however, the winding step S10 is performed prior to the permeation step S30, and the wound electrode body 20a is produced thus using dry sheet members. It becomes therefore possible to properly prevent winding defects and sheet member breakage in the winding step S10.

(2) Temporary Pressing Step S20

As illustrated in FIG. 4, in the production method according to the present embodiment a temporary pressing step S20 is provided between the winding step S10 and the permeation step S30. In this temporary pressing step S20 the cylindrical wound electrode body 20a produced in the winding step S10 is pressed to form a flat-shaped wound electrode body 20, such as that illustrated in FIG. 2. Specifically, the cylindrical wound electrode body 20a is squashed, so as to be tucked, as a result of which the flat-shaped wound electrode body 20 can be formed. In the present step, pressure is preferably regulated so that the wound electrode body 20 does not completely undergo plastic deformation and there is margin for elastic deformation. That is because if the wound electrode body 20 completely undergoes plastically deformation in the present step, the permeability of the nonaqueous electrolyte solution in the permeation step S30 described below may decrease. Specifically, the pressure in the present step is preferably regulated as appropriate taking into consideration for instance spring-back derived from the elastic force of the wound electrode body, the coating thickness of the active material layers, and the thickness of the collectors, for the purpose of properly forming the wound electrode body to a flat shape. For example, the pressure in the temporary pressing step S20 is preferably 0.1 kN/m$^2$ or higher, more preferably 0.25 kN/m$^2$ or higher, and particularly preferably 0.4 kN/m$^2$ or higher. From the viewpoint of preventing the wound electrode body 20 from completely undergoing plastic deformation, on the other hand, the pressure in the present step is preferably 1.0 kN/m$^2$ or lower, more preferably 0.7 kN/m$^2$ or lower, and particularly preferably 0.5 kN/m$^2$ or lower.

(3) Permeation Step S30

Figure 6:
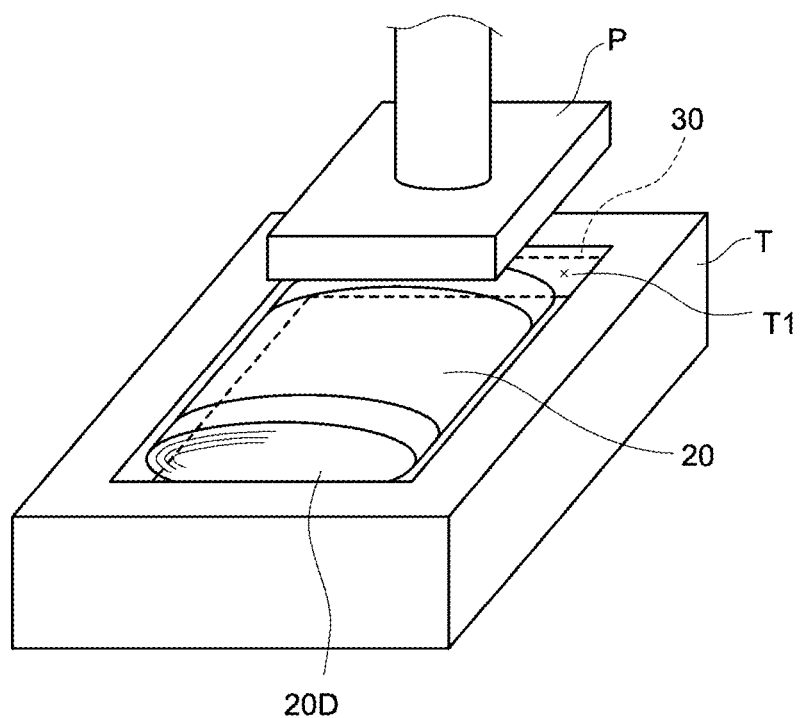
FIG. 6 is a perspective-view diagram illustrating schematically a permeation step in a production method according to an embodiment.

FIG. 6 is a diagram illustrating schematically a permeation step in the production method according to the present embodiment. As illustrated in FIG. 6, pressing and releasing of the wound electrode body 20 are repeated in the present step in a state where the wound electrode body 20 is immersed in the nonaqueous electrolyte solution 30. This allows as a result the nonaqueous electrolyte solution 30 to permeate into the wound electrode body 20. In the permeation step S30 there are specifically used a permeation tank T that stores the nonaqueous electrolyte solution 30 and a press jig P that presses the wound electrode body 20. A square recess T1 is formed in the permeation tank T, such that the nonaqueous electrolyte solution 30 is stored in the recess T1. The press jig P is lowered, to thereby press the wound electrode body 20, in a state where the wound electrode body 20 is accommodated in recess T1 and immersed in the nonaqueous electrolyte solution 30. The distance between the positive electrode and the negative electrode of the wound electrode body 20 is reduced as a result, and in consequence air remaining in the interior of the wound electrode body 20 is driven out. The press jig P is then raised to thereby relieve the pressure acting on the wound electrode body 20; thereupon, the distance between the positive electrode and the negative electrode of the wound electrode body 20 increases, and as a result the nonaqueous electrolyte solution 30 flows into the wound electrode body 20 through the electrolyte solution flow channel 20D. In the permeation step S30, pressing and releasing of the wound electrode body 20 are repeated thus multiple times, to permeate the nonaqueous electrolyte solution 30 into the wound electrode body 20 on account of the resulting pumping effect. This allows significantly reducing in consequence the time required to cause a sufficient amount of nonaqueous electrolyte solution 30 to permeate, as compared with conventional techniques that rely on capillarity. Specifically, permeation times of several hours to several tens of hours are required in conventional techniques relying on capillarity. The production method according to the present embodiment, by contrast, allows a sufficient amount of the nonaqueous electrolyte solution to permeate in a very short permeation time, of several minutes to several tens of minutes.

In the production method according to the present embodiment, moreover, the permeation step S30 is carried out prior to the terminal connection step S50. In other words, in the present embodiment the step of eliciting permeation of the nonaqueous electrolyte solution 30 is carried out before part of the electrolyte solution flow channel 20D is blocked through connection of the electrode terminal 40 and the wound electrode body 20. The permeation time of the nonaqueous electrolyte solution can be further shortened as a result.

In the present embodiment the wound electrode body 20 is formed into a flat shape before the permeation step S30 is performed. As a result, uniform pressure can be easily applied to the wound electrode body 20 in the permeation step S30, and accordingly the pumping effect derived from repeated pressing and releasing can be brought out yet more properly. The cylindrical wound electrode body exhibits poor liquid retention capacity on account of the excessive distance between the positive electrode and the negative electrode, and the nonaqueous electrolyte solution having permeated tends thus to leak. By contrast, in the flat-shaped wound electrode body 20 resulting from the temporary pressing step S20 the distance between the positive electrode and the negative electrode is properly regulated, and accordingly it becomes possible to properly suppress leakage of nonaqueous electrolyte solution having permeated.

In the permeation step S30 the pressure exerted on the wound electrode body 20 is preferably 0.5 kN/m$^2$ or higher, more preferably 0.6 kN/m$^2$ or higher, and particularly preferably 0.7 kN/m$^2$ or higher. As a result, the pumping effect can be elicited properly, and the nonaqueous electrolyte solution can be permeated efficiently into the wound electrode body 20. On the other hand, when the pressure in the present step is set too high the wound electrode body 20 may undergo plastic deformation, and the permeation efficiency of the nonaqueous electrolyte solution may rather drop. From the above viewpoint, the pressure in the permeation step S30 is preferably 1.5 kN/m$^2$ or less, more preferably 1.4 kN/m$^2$ or less, yet more preferably 1.2 kN/m$^2$ or less, and particularly preferably 1 kN/m$^2$ or less.

In addition, the number of times of pressing in permeation step S30 is preferably 1 or more, more preferably 2 or more, and particularly preferably 3 or more. As a result a pumping effect can be elicited properly, and the nonaqueous electrolyte solution can be pumped efficiently into the wound electrode body 20. On the other hand, repeating pressing and releasing of the wound electrode body 20 after sufficient permeation of the nonaqueous electrolyte solution 30 merely entails a longer permeation time. Accordingly, the number of times of pressing in the permeation step S30 is preferably 7 or fewer, more preferably 6 or fewer, yet more preferably 5 or fewer, and particularly preferably 4 or fewer.

The production method according to the present embodiment can be used particularly suitably to produce a nonaqueous electrolyte secondary battery that utilizes a large-size wound electrode body. Although a large-size wound electrode body contributes to increasing capacity and increasing energy density, it is however difficult to cause a sufficient amount of nonaqueous electrolyte solution to permeate quickly in a large-size wound electrode body. In the production method according to the present embodiment, by contrast, there is performed the permeation step S30 for pumping a nonaqueous electrolyte solution into the wound electrode body, on account of a pumping effect, and accordingly the nonaqueous electrolyte solution can be caused to permeate reliably and in a short time, even when using such a large-size wound electrode body. That is, the production method according to the present embodiment allows enjoying only the advantages of using a large-size wound electrode body, while eliminating the disadvantages.

For instance, the length (width dimension) of the wound electrode body 20 in the width direction X is preferably 150 mm or larger, more preferably 200 mm or larger, and particularly preferably 300 mm or larger. In this type of wound electrode body 20 having a large width dimension it is difficult to cause the nonaqueous electrolyte solution to sufficiently permeate up to the central portion in the width direction X in accordance with a conventional method relying on capillarity. The permeation step S30 in the present embodiment, however, involves pumping the nonaqueous electrolyte solution 30 into the wound electrode body 20 on account of a pumping effect, and accordingly the nonaqueous electrolyte solution 30 can be caused to permeate sufficiently also into such a wound electrode body 20 of large width dimension. The upper limit of the width dimension of the wound electrode body 20 is not particularly restricted, but may be 500 mm or less, or 450 mm or less, or 400 mm or less.

The length (height dimension) of the wound electrode body 20 in the height direction Z is preferably 100 mm or larger, more preferably 125 mm or larger, and particularly preferably 150 mm or larger. As depicted in the surplus electrolyte solution 32 of FIG. 1, the nonaqueous electrolyte solution injected into battery case 10 tends to pool at the bottom in the height direction Z. Therefore, a wound electrode body 20 having a large height dimension is problematic in that the nonaqueous electrolyte solution 30 is not readily supplied to the upper region of the wound electrode body 20 in the height direction Z. In the permeation step S30 of the present embodiment, by contrast, pressing and releasing of the wound electrode body 20 are repeated in a state where the entirety of the wound electrode body 20 is immersed in the nonaqueous electrolyte solution 30, as illustrated in FIG. 6. Accordingly, the nonaqueous electrolyte solution 30 can be caused to sufficiently permeate up to the upper end portion in the height direction Z, also when using a large-size wound electrode body 20 having a height dimension of 100 mm or larger. The upper limit of the height dimension of the wound electrode body 20 is not particularly restricted, and may be 250 mm or less, or 225 mm or less, or 200 mm or less.

Examples of a large-size wound electrode body 20 include a wound electrode body in which the number of turns over which the sheet members are wound is 25 turns or more (preferably 30 turns or more, particularly preferably 35 turns or more). In a wound electrode body 20 of this type having a large number of winding turns the distance between the positive electrode and the negative electrode becomes smaller on account of the increased tension at the time of winding, and as a result the nonaqueous electrolyte solution 30 tends not to permeate readily. The permeation step S30 in the present embodiment, however, involves pumping the nonaqueous electrolyte solution 30 into the wound electrode body 20 on account of a pumping effect, and accordingly the nonaqueous electrolyte solution 30 can be caused to permeate sufficiently also into such a wound electrode body 20 of large number of winding turns. The upper limit of the number of winding turns of the sheet members is not particularly restricted, and may be 50 turns, or 45 turns, or 40 turns.

A nonaqueous electrolyte secondary battery that utilizes a high-viscosity nonaqueous electrolyte solution can be produced efficiently by performing a permeation step S30 such as that of the present embodiment. Specifically, the nonaqueous electrolyte solution of the nonaqueous electrolyte secondary battery may flow out to the exterior of the wound electrode body due to the expansion and contraction of the sheet members (in particular the negative electrode) that accompanies charge and discharge. By contrast, outflow of nonaqueous electrolyte solution accompanying charge and discharge can be suppressed when using a high-viscosity nonaqueous electrolyte solution. On the other hand, a high-viscosity nonaqueous electrolyte solution exhibits low permeability into the wound electrode body, which translates into significantly reduced production efficiency. It has therefore been difficult to use high-viscosity nonaqueous electrolyte solutions in conventional methods relying on capillarity. In the production method according to the present embodiment the nonaqueous electrolyte solution 30 can be pumped into the wound electrode body 20, on account of a pumping effect, also when the viscosity in the nonaqueous electrolyte solution 30 is high. That is, the production method according to the present embodiment allows producing, with high manufacturing efficiency, a nonaqueous electrolyte secondary battery that utilizes a high-viscosity nonaqueous electrolyte solution.

(4) Main Pressing Step S40

In the production method according to the present embodiment the main pressing step S40 is provided between the permeation step S30 and the terminal connection step S50, as illustrated in FIG. 4. In this main pressing step S40 the flat surface of a flat-shaped wound electrode body 20 is further pressed, to plastically deform the wound electrode body 20 down to a thickness such that the wound electrode body 20 can be accommodated in the battery case 10. As described above, in the temporary pressing step S20 the wound electrode body 20 does not completely undergo plastic deformation, and there is some margin left for elastic deformation. It is difficult to accommodate the wound electrode body 20, in such a state, in the interior of battery case 10. In the present step the wound electrode body is therefore plastically deformed to a thickness such that the wound electrode body can be accommodated in the battery case 10. By carrying out the present step, moreover, the distance between the positive electrode and the negative electrode in the wound electrode body 20 becomes uniform, which allows contributing to stabilizing battery performance.

(5) Terminal Connection Step S50

In this step the electrode terminal 40 is connected to the wound electrode body 20. In the present step there is prepared for instance the lid body 12 to which the pair of electrode terminals 40 is attached (see FIG. 3). A joining process is then performed in a state where the vicinity of the central portion of the negative electrode connection portion 20C and the lower end 40a of the negative electrode terminal 44 are pressed so as to be tucked in the depth direction Y. The connection portion 40b becomes formed as a result that connects the negative electrode connection portion 20C and the negative electrode terminal 44. The positive electrode connection portion 20B and the positive electrode terminal 42 are then connected (see FIG. 1) in accordance with the same procedure as that on the negative electrode side. As a result an assembly 1A (see FIG. 8) is obtained in which the lid body 12 and the wound electrode body 20 are connected to each other. When the present step is performed, part of the electrolyte solution flow channel 20D of the wound electrode body 20 (for instance the vicinity of the central portion in height direction Z) becomes blocked, thus restricting the flow of the nonaqueous electrolyte solution. This allows suppressing as a result leakage of nonaqueous electrolyte solution from the interior of the wound electrode body 20.

In the production of ordinary nonaqueous electrolyte secondary batteries, for instance ultrasonic bonding is used in a joining process for connecting electrode terminals and the wound electrode body. In the production method according to the present embodiment, however, the nonaqueous electrolyte solution is adhered to the wound electrode body 20, and accordingly a new surface does not form readily even when ultrasonic bonding is performed, and in some instances it may be not possible to firmly connect the wound electrode body 20 and the electrode terminal 40. Therefore, in the production method according to the present embodiment resistance welding or laser welding is preferably resorted to in the joining process of the wound electrode body 20 and the electrode terminal 40. These joining processes allow the wound electrode body 20 and the electrode terminals 40 to be firmly joined to each other even if the nonaqueous electrolyte solution 30 is adhered to the wound electrode body 20.

(6) Film Accommodation Step S60

Figure 7:
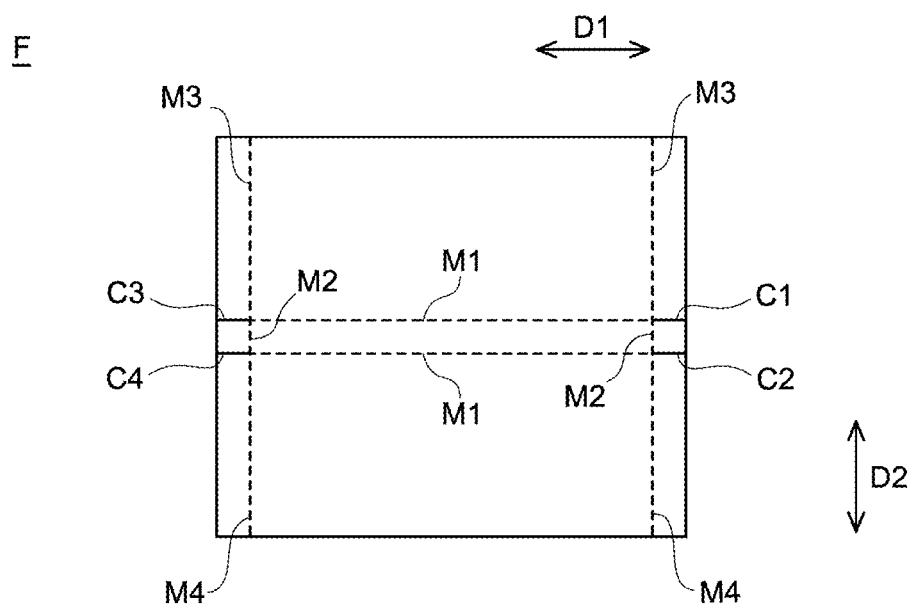
FIG. 7 is a plan-view diagram illustrating an insulating film used in a production method according to an embodiment.
Figure 8:
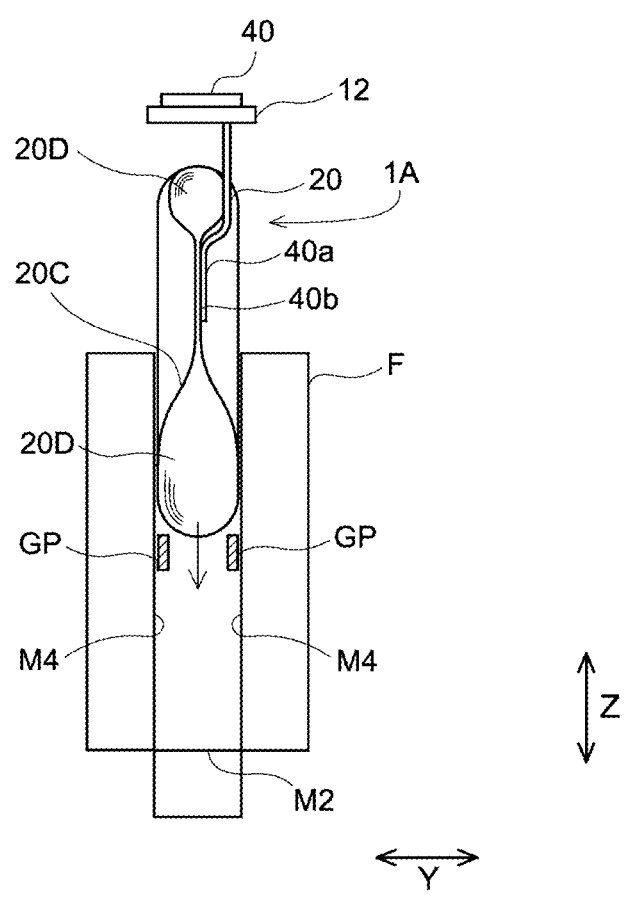
FIG. 8 is a side-view diagram illustrating schematically a film accommodation step in a production method according to an embodiment.
Figure 9:
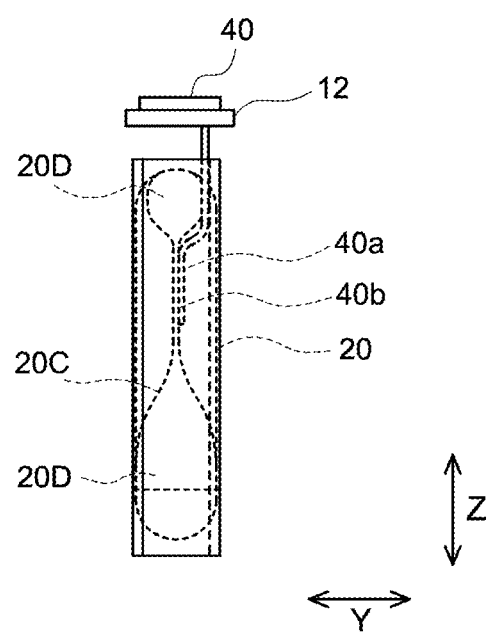
FIG. 9 is a side-view diagram illustrating schematically a film accommodation step in a production method according to an embodiment.

As illustrated in FIG. 4, in the production method according to the present embodiment a film accommodation step S60 is provided between the terminal connection step S50 and the sealing step S70. In the film accommodation step S60 the wound electrode body 20 is accommodated in the box-shaped insulating film 70 that insulates the battery case 10 and the wound electrode body 20 from each other (see FIG. 1). By performing the present step after execution of the terminal connection step S50 it becomes possible to prevent that nonaqueous electrolyte solution having leaked from the wound electrode body 20 should scatter over a wide area. The present step will be specifically explained with reference to FIG. 7 to FIG. 9. FIG. 7 is a plan-view diagram illustrating an example of an insulating film used in the production method according to the present embodiment. FIG. 8 is a side-view diagram illustrating schematically a film accommodation step in the production method according to the present embodiment. FIG. 9 is a side-view diagram illustrating schematically a film accommodation step in the production method according to the present embodiment.

In the present step a rectangular insulating film F such as that illustrated in FIG. 7 is prepared first. For convenience of explanation, the horizontal direction in FIG. 7 will be referred to as "first direction D1" and the vertical direction will be referred to as "second direction D2". In the present step, firstly two rule lines M1 extending substantially parallelly to each other are set in the first direction D1, at a central portion of the second direction D2, the insulating film F being then bent along the rule lines M1. The insulating film F becomes shaped as a result in the form of a U when viewed from the side. Cut lines C1 to C4 are then formed, along the rule lines M1, on both side edge portions in the first direction D1. Next, the portion of the wound electrode body 20 in the assembly 1A is inserted into the U-shaped insulating film F, as illustrated in FIG. 8. The insulating film F is bent along the rule lines M2 to M4 so as to cover both side faces of the wound electrode body 20, and the insulating film F is folded inward, as illustrated in FIG. 9. The wound electrode body 20 becomes accommodated as a result in the interior of the box-shaped insulating film 70. With ease of insertion and positional adjustment of the wound electrode body 20 in mind, preferably bending along the rule lines M2 is performed after bending along the rule lines M3 and the rule lines M4 at the time where the insulating film F is folded inward.

In the present embodiment the nonaqueous electrolyte solution is adhered to the surface of the wound electrode body 20. In consequence, the wound electrode body 20 may closely adhere to the inner surface of the insulating film 70, thereby making it difficult to insert the wound electrode body 20 in the insulating film 70. In the present step, therefore, a guide plate GP is preferably disposed in the interior of the insulating film 70, as illustrated in FIG. 8. This allows inserting the wound electrode body 20 in the insulating film 70 while preventing the wound electrode body 20 and the insulating film 70 from coming into close contact with each other. The shape of the guide plates GP is not particularly limited. For instance, in FIG. 8 guide plates GP extending in the width direction (direction perpendicular to the paper surface) are disposed on the inward side of the insulating film 70. By raising then the guide plate GP accompanying the descent of the assembly 1A, the wound electrode body 20 can become inserted while keeping spaced apart from each other the sites of close contact between the wound electrode body 20 and the insulating film 70. Another example of the shape of the guide plates may be rail-shaped guide plates that extend in the height direction. Close contact between the wound electrode body and the insulating film can be forestalled in a case where the wound electrode body is inserted along such a rail-shaped guide plate.

(7) Sealing Step S70

In this step the wound electrode body 20 is accommodated in the interior of the battery case 10, and thereafter the battery case 10 is sealed. As a result, a nonaqueous electrolyte secondary battery 1 (see FIG. 1) is produced in which the wound electrode body 20 and the nonaqueous electrolyte solution 30 are accommodated in the battery case 10.

Figure 10:
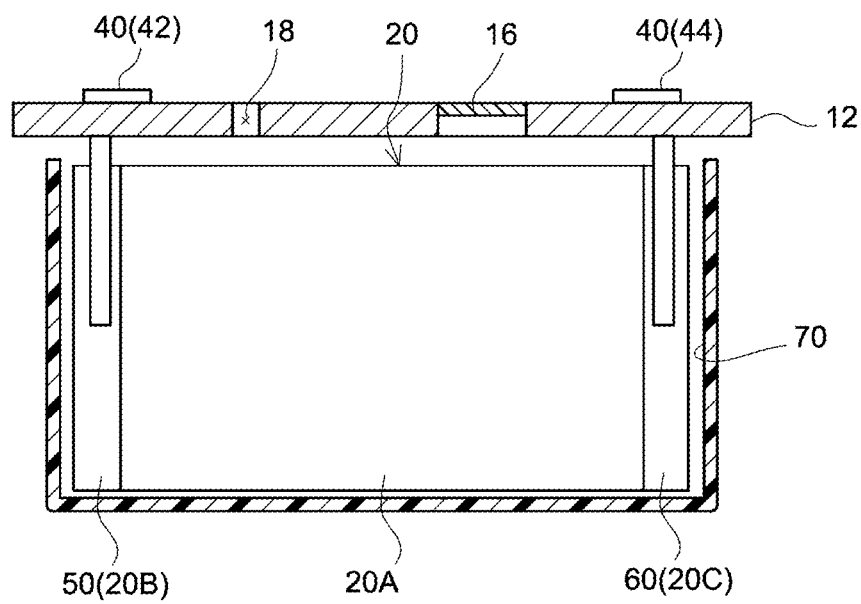
FIG. 10 is a cross-sectional diagram illustrating schematically a sealing step in a production method according to an embodiment.
Figure 10:
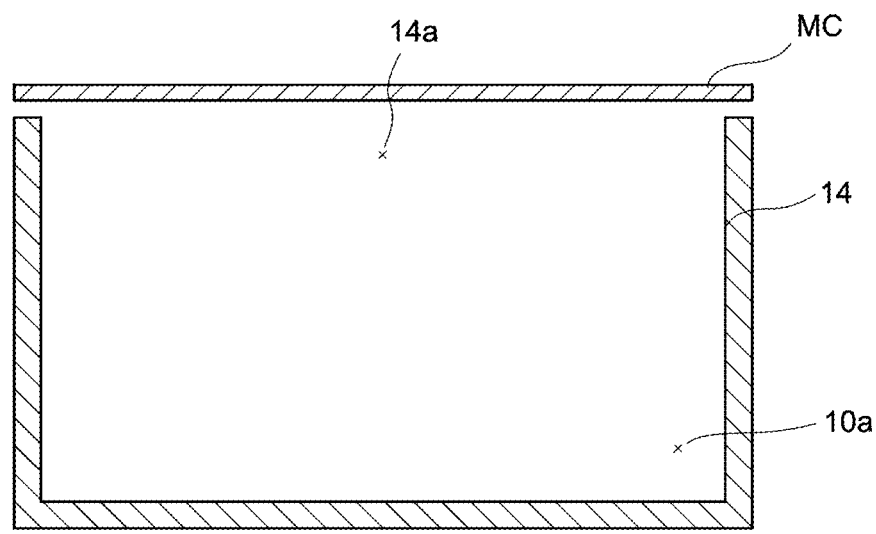

In the production of a general nonaqueous electrolyte secondary battery, the case body is placed at the top in the direction of gravity, in order to prevent foreign matter such as dust from intruding into the case body, and the sealing step is performed in a state where the opening 14a of the case body points downward in the direction of gravity. In the sealing step S70 of the present embodiment, by contrast, the battery case 10 (case body 14) is disposed at the bottom in the direction of gravity (at the bottom in the height direction Z), such that the opening of the case body 14 points upward in the direction of gravity, as illustrated in FIG. 10. The wound electrode body 20 accommodated within the insulating film 70 is disposed at the top in the direction of gravity (at the top in the height direction Z), and the wound electrode body 20 is inserted into the battery case 10 from the top down. As a result, the sealing step S70 can be performed while holding, within the insulating film 70, nonaqueous electrolyte solution having leaked from the wound electrode body 20; this allows therefore preventing deterioration of the manufacturing environment derived from scattering of the nonaqueous electrolyte solution over a wide area. In a case where the opening 14a of the case body 14 faces upward in the direction of gravity, as in the present embodiment, preferably the opening 14a of the case body 14 is covered with a movable cover MC until right before the wound electrode body 20 starts being accommodated. Foreign matter can be prevented as a result from intruding into the case body 14.

Figure 11:
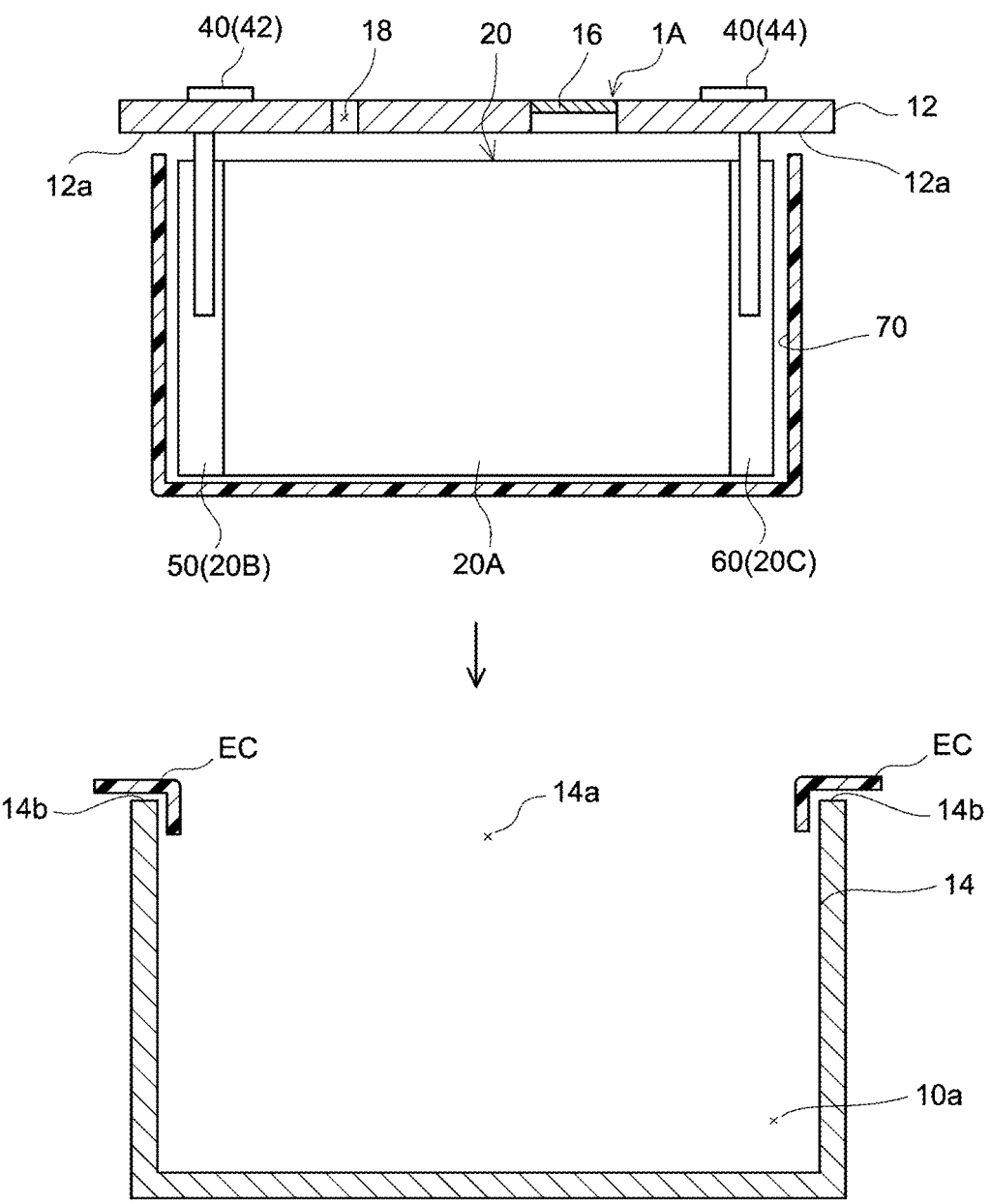
FIG. 11 is a cross-sectional diagram illustrating schematically a sealing step in a production method according to an embodiment.

As illustrated in FIG. 11, in the present step the movable cover MC is removed to release the opening 14a of the case body 14, after which the assembly 1A is lowered, to insert the wound electrode body 20 into the case body 14. Next, a bottom face 12*a* of the outer peripheral edge portion of the lid body 12 and the upper end face 14*b* of the case body 14 are brought into contact with each other. The contact portion between the lid body 12 and the case body 14 is then joined by laser welding or the like. As a result, the battery case 10 is formed, and the wound electrode body 20 and the nonaqueous electrolyte solution 30 are accommodated in the internal space 10*a* of the battery case 10 (see FIG. 1). In the present embodiment, a small amount of nonaqueous electrolyte solution is injected through the filling port 18, to generate the surplus electrolyte solution 32 in the battery case 10. The filling port 18 is thereafter sealed with the sealing plug 18*a*. The nonaqueous electrolyte secondary battery 1 is thus produced as a result.

In the present step, joining between the case body 14 and the lid body 12 may be defective when the nonaqueous electrolyte solution adheres to the upper end face 14*b* of the case body 14. It is therefore preferable to cover the upper end face 14*b* of the case body 14 with an end cover EC, as illustrated in FIG. 11, while the wound electrode body 20 is being inserted into the case body 14.

As described above, in the production method according to the present embodiment the permeation step S30 is performed prior to plugging of part of the electrolyte solution flow channel 20D through connection of the electrode terminal 40. In the permeation step S30, moreover, pressing and releasing of the wound electrode body is repeated in a state where the wound electrode body is immersed in the nonaqueous electrolyte solution, and the nonaqueous electrolyte solution is pumped into the wound electrode body on account of the resulting pumping effect. The permeation time, which used to be several hours to several tens of hours in conventional art relying on capillarity, can be shortened herein as a result to several minutes to several tens of minutes.

When the electrolyte solution is caused to permeate in accordance with a conventional technique relying on capillarity, moreover, a streak-like unpermeated region extending in the height direction of the wound electrode body is very likely to arise in the vicinity of the central portion of the wound electrode body in the width direction. Charge and discharge are not conducted properly in such an unpermeated region, which may translate into poorer battery performance. In a nonaqueous electrolyte secondary battery produced in accordance with the production method according to the present embodiment, by contrast, the above-described streak-like unpermeated region does not arise in the wound electrode body, and the nonaqueous electrolyte solution can be caused to properly permeate throughout the wound electrode body. Therefore, the production method according to the present embodiment can also contribute to improving the performance of the nonaqueous electrolyte secondary battery that is produced, 3. Other Embodiments The production method disclosed herein is not limited to the above-described embodiment, and encompasses various embodiments. For instance, the production method disclosed herein may include the winding step S10, the permeation step S30, the terminal connection step S50 and the sealing step S70. By performing at least these steps a nonaqueous electrolyte secondary battery can be produced by causing a nonaqueous electrolyte solution to permeate reliably and in a short time into a wound electrode body. That is, the temporary pressing step S20, the main pressing step S40, and the film accommodation step S60 explained in the above-described embodiment can be omitted.

In the above-described embodiment, for instance, the cylindrical wound electrode body 20*a* is produced using a cylindrical winding shaft WL in the winding step S10, and accordingly the temporary pressing step S20 in which the flat-shaped wound electrode body 20 is formed is carried out prior to the permeation step S30. However, the temporary pressing step is not an essential step, and may be omitted as appropriate. For instance, the flat-shaped wound electrode body can be produced, even omitting the temporary pressing step, if a flat plate-like winding shaft is used in the winding step. The shape of the electrode body that is subjected to the permeation step S30 may be other than a flat shape. In the production method disclosed herein a nonaqueous electrolyte solution can be caused to permeate into a wound electrode body, reliably and in a short time, also when a cylindrical wound electrode body is subjected to the permeation step.

The production method disclosed herein includes an aspect in which the main pressing step is performed before the permeation step. In this aspect, a completely plastically deformed wound electrode body is subjected to the permeation step, and accordingly the permeation time of the nonaqueous electrolyte solution in the permeation step tends to be somewhat longer. The permeation time in a case where such an aspect is adopted, however, is about several tens of minutes, and is thus significantly shortened as compared with conventional instances. In a case where this aspect is adopted, moreover, the temporary pressing step can be omitted, and hence equipment for pressing and deforming the wound electrode body can be reduced, thus cutting equipment costs.

Further, in the above-described embodiment the wound electrode body 20 is accommodated in the interior of the box-shaped insulating film 70, as illustrated in FIG. 1. Depending on the structure of the nonaqueous electrolyte secondary battery, however, the insulating film can be omitted. For instance in a case where the battery case has insulating properties, conduction between the wound electrode body and the battery case can be prevented even without using an insulating film. Examples of battery cases having insulating properties include cases in which an insulating layer is formed on an inner peripheral face that can come into contact with the electrode body. The film accommodation step can thus be omitted when using a battery case having such a structure.

In the above-described embodiment, a small amount of nonaqueous electrolyte solution is injected in the sealing step S70, to generate the surplus electrolyte solution 32 within the battery case 10. In the production method disclosed herein, however, a sufficient amount of nonaqueous electrolyte solution can be caused to permeate in the permeation step, and therefore dry-out of the interior of the wound electrode body accompanying charge and discharge can be sufficiently suppressed even if no surplus electrolyte solution is provided. In a case where no surplus electrolyte solution is provided there is no need for forming a filling port or sealing plug in the battery case (lid body). This can accordingly contribute to cutting manufacturing costs through a reduction in the number of parts and processes.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A method for producing a nonaqueous electrolyte secondary battery in which a wound electrode body and a nonaqueous electrolyte solution are accommodated inside a battery case, the method comprising at least:
    a winding step of forming a wound electrode body by winding a positive electrode and a negative electrode across a separator;
    a permeation step of immersing the wound electrode body in the nonaqueous electrolyte solution and repeatedly pressing and releasing the wound electrode body, to thereby cause the nonaqueous electrolyte solution to permeate into the wound electrode body;
    a terminal connection step of connecting an electrode terminal to the wound electrode body;
    an accommodating step of accommodating the wound electrode body inside a battery case; and
    a sealing step of sealing the battery case, wherein
    the permeation step is performed in a state that the wound electrode body formed at the winding step is outside the battery case.

2. The method according to claim 1, wherein the pressure at the time of pressing of the wound electrode body in the permeation step is set to 0.7 kN/m² to 1 kN/m².

3. The method according to claim 1, wherein the number of times that the wound electrode body is pressed in the permeation step is set to 3 times to 4 times.

4. The method according to claim 1, further comprising:
    a temporary pressing step of shaping the wound electrode body, through pressing, to a flat shape; and
    a main pressing step of further pressing a flat surface of the flat-shaped wound electrode body, to plastically deform the wound electrode body down to a thickness enabling accommodation in the battery case,
    wherein
    the temporary pressing step is provided between the winding step and the permeation step; and
    the main pressing step is provided between the permeation step and the terminal connection step.

5. The method according to claim 4, wherein the pressure at the time of pressing of the wound electrode body in the temporary pressing step is set to 0.1 kN/m² to 0.5 kN/m².

6. The method according to claim 1, wherein in the terminal connection step the electrode terminal is connected to the wound electrode body by resistance welding or laser welding.

7. The method according to claim 1, further comprising a film accommodation step of accommodating the wound electrode body in a box-shaped insulating film that insulates the battery case and the wound electrode body, wherein the film accommodation step is performed between the terminal connection step and the sealing step.

8. The method according to claim 7, wherein in the film accommodation step the wound electrode body is inserted in the insulating film while a plate-shaped guide plate is brought into contact with a surface of the wound electrode body.

9. The method according to claim 7, wherein in the sealing step the wound electrode body accommodated in the insulating film is disposed at the top in the direction of gravity, and the battery case is disposed at the bottom in the direction of gravity.

10. The method according to claim 9, wherein in the sealing step a top face opening of the battery case is covered with a movable cover until the wound electrode body starts being accommodated inside the battery case.

11. The method according to claim 9, wherein in the sealing step the wound electrode body is accommodated inside the battery case in a state where an upper end face of the battery case is covered with an end cover.

12. The method according to claim 7, wherein
    the permeation step is performed after the winding step and before the terminal connection step, and
    the film accommodation step is performed after the terminal connection step and before the sealing step.

13. The method according to claim 1, wherein a width dimension of the wound electrode body is 200 mm or more and 500 mm or less.

14. The method according to claim 1, wherein a height dimension of the wound electrode body is 100 mm or more and 250 mm or less.

15. The method according to claim 1, wherein a number of winding turns of the wound electrode body is 35 turns or more and 50 turns or less.

16. The method according to claim 1, wherein the permeation step is performed after the winding step and before the terminal connection step.

17. The method according to claim 1, wherein
    in the permeation step, the wound electrode body formed at the winding step is directly pressed by a press jig in a state where the wound electrode body formed at the winding step is immersed in the nonaqueous electrolyte solution.

18. The method according to claim 17, wherein
    the permeation step is performed before the accommodating step, and
    the accommodating step is performed before the sealing step.

* * * * *